United States Patent
Huang et al.

(10) Patent No.: US 7,433,087 B2
(45) Date of Patent: Oct. 7, 2008

(54) AXLE SLEEVE APPARATUS FOR OPTICAL CHASSIS

(75) Inventors: Yin-Chun Huang, Hsinchu (TW); Chien-Liang Yeh, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 1203 days.

(21) Appl. No.: 10/142,386

(22) Filed: May 8, 2002

(65) Prior Publication Data

US 2003/0095292 A1    May 22, 2003

(30) Foreign Application Priority Data

Nov. 20, 2001    (TW) .............................. 90219953 U

(51) Int. Cl.
*H04N 1/04*    (2006.01)

(52) U.S. Cl. ........................ 358/474; 358/471; 358/497; 358/494

(58) Field of Classification Search ................ 359/196; 358/409, 489, 491, 480, 474, 471, 497, 494, 358/505; 399/211, 212; 250/234–236, 216, 250/239; 382/312

See application file for complete search history.

(56) References Cited

U.S. PATENT DOCUMENTS 3,816,659 A * 6/1974 Landsman ................... 358/491
4,131,916 A * 12/1978 Landsman ................... 358/409

* cited by examiner

*Primary Examiner*—Cheukfan Lee
(74) *Attorney, Agent, or Firm*—Stolowitz Ford Cowger LLP

(57) ABSTRACT

The invention provides an axle sleeve apparatus for optical chassis. By the guidance of a guiding rod, the optical chassis making a linear displacement motion along the extension direction of the guiding rod. The axle sleeve apparatus for optical chassis includes an axle sleeve main body and at least one anchoring mechanism. The axle sleeve main body has a fastening mechanism capable of proceeding connection with the optical chassis. The anchoring mechanism is arranged at one side of the axle sleeve main body and capable of proceeding connection with the guiding rod. It is arranged with: a convex arm extending out one side of the axle main body and an elastic body corresponding to the convex arm. By elastic force, the elastic body may move between a first position and a second position. Wherein, the elastic body chooses to be located at the first position to make the axle sleeve apparatus for optical chassis connected with the guiding rod and make a linear displacement motion along the extension direction of the guiding rod, or the elastic body chooses to be located at the second position to make the axle sleeve apparatus for optical chassis separate from the guiding rod.

45 Claims, 12 Drawing Sheets

AXLE SLEEVE APPARATUS FOR OPTICAL CHASSIS

FIELD OF THE INVENTION

The invention relates to an axle sleeve apparatus, especially to an axle sleeve apparatus for optical chassis that is being connected with or separated from the guiding rod of a scanner.

BACKGROUND OF THE INVENTION

Recently, since the abrupt progress of high technology, especially the relative field of the manufacture of the microelectronic technology further changes day by day, so the computer has already penetrated into each family and business and become a necessary and indispensable electronic product. Following the prevalence of multi-media of computers, more peripheral products are needed as devices for input and output. Since the continuous innovation for the optical semi-conductor technology, so the product technology of the relative peripheral equipment of computers such as optical scanners becomes more matured day by day, and the optical scanner is more and more popular as a necessary product in the computer's peripheral equipment.

Please refer to FIG. 1A, which is a structural illustration of an embodiment of typical flatbed-type optical scanner used in prior arts. Its main structure includes a document window glass 12 arranged on the upper side surface of the outer shell 11 of an optical scanner for supporting a document 16 to be scanned. Brought along by a driving device 13, an optical chassis 14 makes a linear motion along the extension direction of the guiding rod 15 in the hollow outer shell 11 and a scanning job is then executed on the document 16 that is supported on the document window glass 12.

Please refer to FIG. 1B, which is a structural illustration of the axial sleeve apparatus for optical chassis used in prior arts. Wherein, an end surface of the optical chassis 14 has an axle sleeve apparatus 17, which is formed integrally with the optical chassis 14 and is connected with the driving apparatus 13 that is a power source (not shown in the figure) bringing along a belt 131 with an appropriate gear ratio. The belt 131 is connected with the optical chassis 14. Therefore, when the driving apparatus 13 brings along the axle sleeve apparatus 17, it is possible to make the both optical chassis 14 and axle sleeve apparatus 17 move synchronously, and by the guidance of the guiding rod 15, the optical chassis 14 makes a linear displacement motion along the guiding rod 15 for executing a scanning job.

Since the aforementioned axle sleeve apparatus 17 for optical chassis used in prior arts and the optical chassis 14 are formed and manufactured integrally, so the optical chassis 14 is connected on the guiding rod 15. Therefore, when the optical chassis 14 or the axle sleeve apparatus 17 for optical chassis is slightly damaged and needs to be changed, one has to take apart the entire outer shell 11 from the optical chassis 1 and the optical chassis 14 is drawn along and separated from the guiding rod 15 to proceed with the exchange. After changing the optical chassis 14, it has to re-proceed the assembly. When different resolutions of scanning are needed, one also has to change the optical chassis 14 according to the aforementioned method, so it causes inconvenience for changing and assembling the optical scanner 1.

SUMMARY OF THE INVENTION

The main object of the present invention is to provide an axle sleeve apparatus for an optical chassis, which may provide the functions of separation from and connection with the guiding rod of a scanner to achieve the modularization of the axle sleeve apparatus for optical chassis for application and connection within guiding rod with different shapes.

A secondary object of the present invention is to provide an axle sleeve apparatus for optical chassis, which may provide the functionality of taking apart from and locking together with the optical chassis of a scanner to achieve the modularization of the axle sleeve apparatus for optical chassis for application and connection in the job of different optical chassis.

A further object of the present invention is to provide an axle sleeve apparatus for optical chassis, which may provide the modularization of a scanner to achieve the goal of reducing material, manufacture cost and labor time of taking apart and assembling together.

To achieve the above-mentioned objects, the invention provides an axle sleeve apparatus for optical chassis. By the guidance of a guiding rod, the optical chassis makes a linear displacement motion along the extension direction of the guiding rod. The axle sleeve apparatus for the optical chassis includes: an axle sleeve main body and at least one anchoring mechanism.

The axle sleeve main body has a fastening mechanism capable of proceeding connection with the optical chassis.

The anchoring mechanism is arranged at one side of the axle sleeve main body and capable of proceeding in connection with the guiding rod. The anchoring mechanism is arranged with: a convex arm extending out one side of the axle main body and an elastic body corresponding to the convex arm. By elastic force, the elastic body may move between a first position and a second position.

The elastic body may be located at the first position connect the axle sleeve apparatus for optical chassis with the guiding rod and make a linear displacement motion along the extension direction of the guiding rod. Alternatively the elastic body may be located at the second position to separate the axle sleeve apparatus for optical chassis from the guiding rod.

SIMPLE DESCRIPTION OF THE DRAWINGS

DETAILED DESCRIPTION OF THE PREFERRED EMBODIMENTS

The main characteristics of the present invention is that the elastic body may choose to be located at the first position to make the axle sleeve apparatus for optical chassis connected with the guiding rod and make a linear displacement motion along the extension direction of the guiding rod, or the elastic body may choose to be located at the second position to make the axle sleeve apparatus for optical chassis separate from the guiding rod.

Figure 1A:
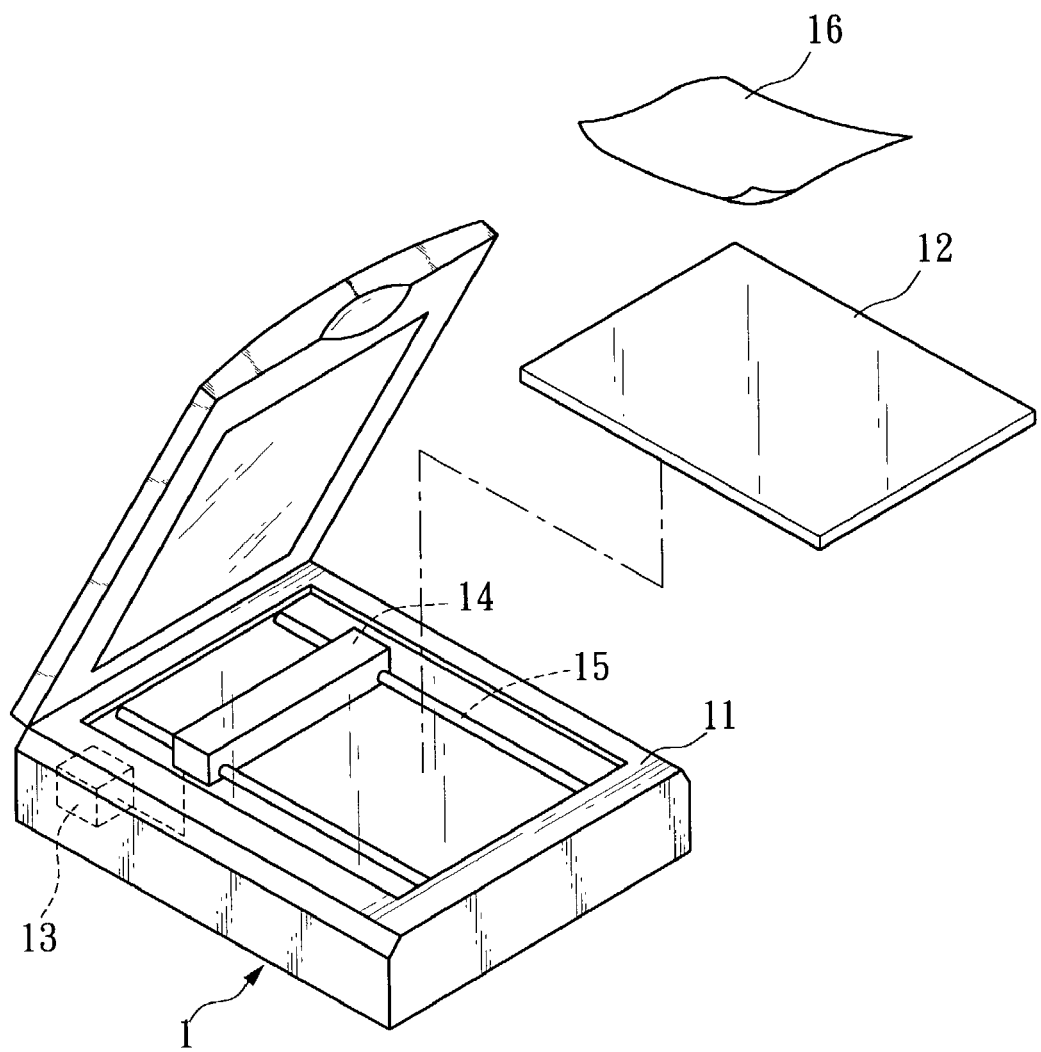
FIG. 1A is an implementation illustration for the three-dimensional structure for the flatbed-typed optical scanner used in the prior arts.
Figure 1B:
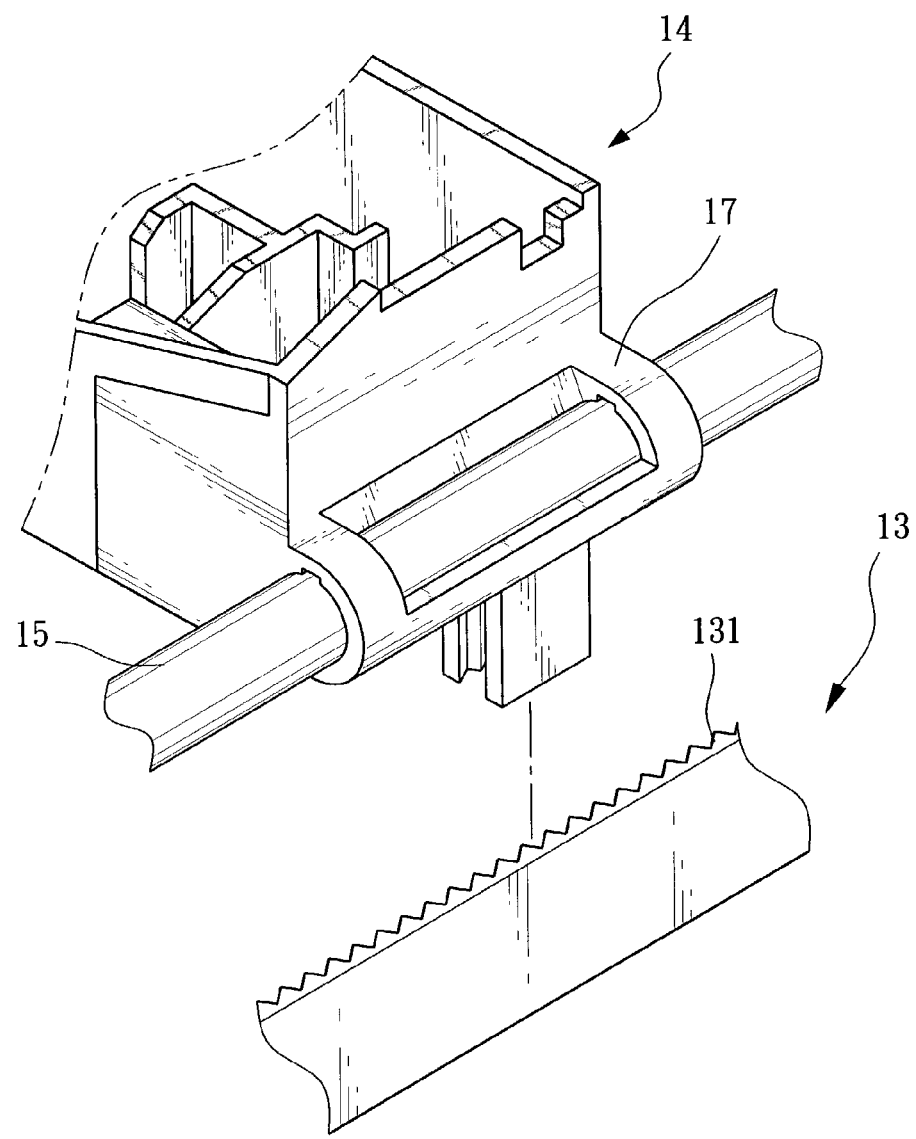
FIG. 1B is an implementation illustration for the three-dimensional structure of the axle sleeve apparatus for optical chassis used in the prior arts.
Figure 2A:
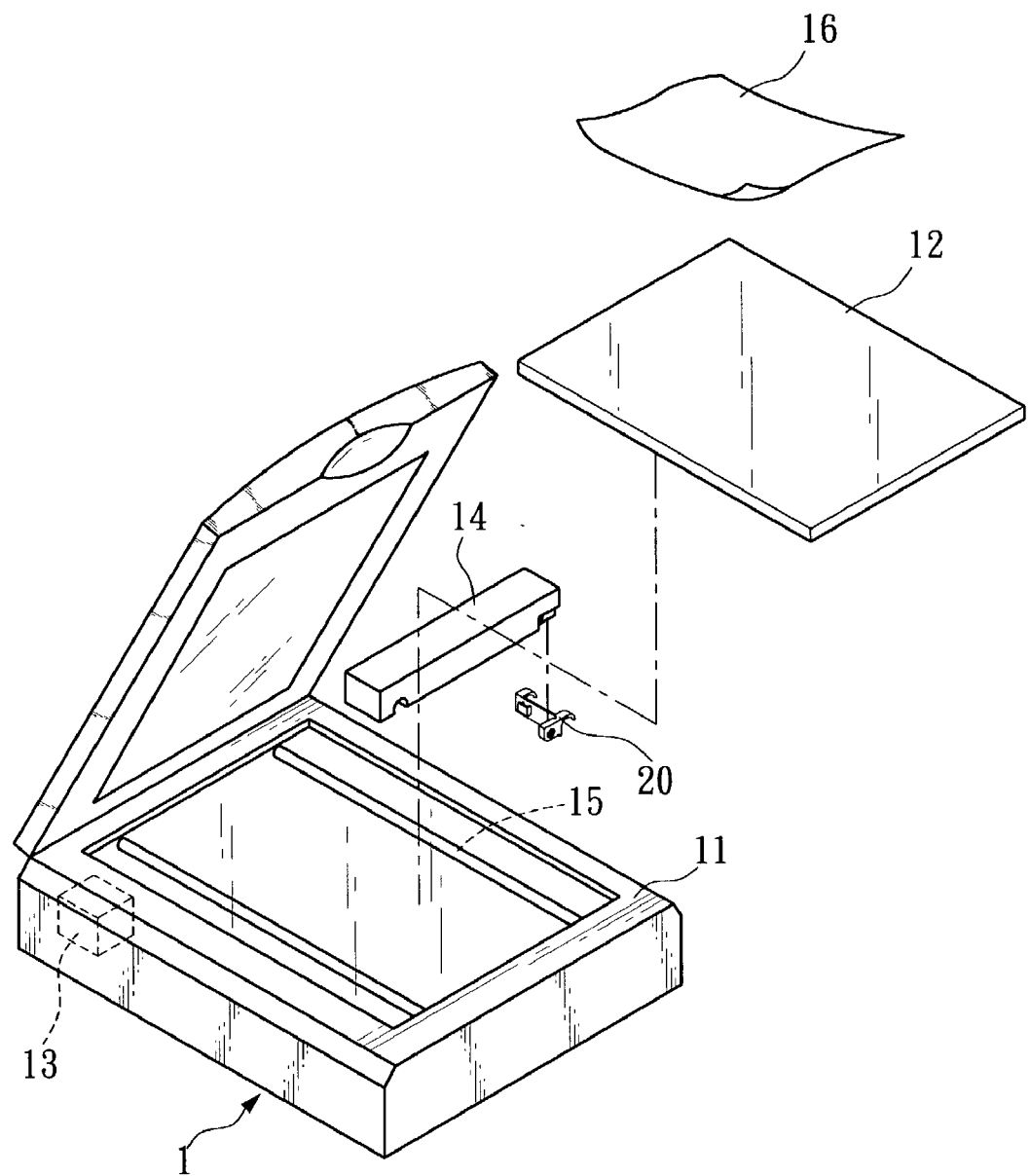
FIG. 2A is a three-dimensional structural illustration for the preferable embodiment of the optical scanner according to the present invention.
Figure 2B:
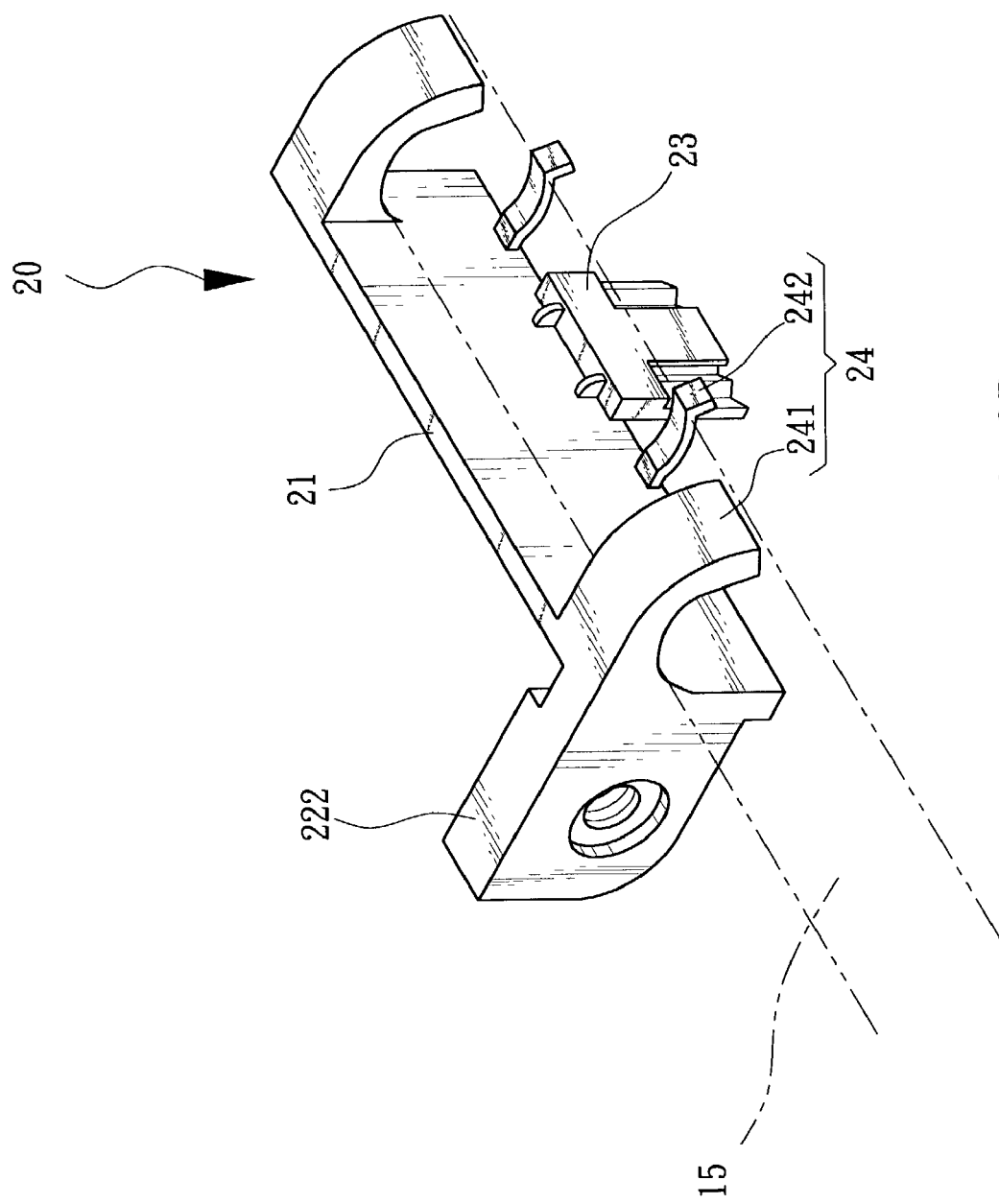
FIG. 2B is an implementation illustration for the three-dimensional structure of the first preferable embodiment of the axle sleeve apparatus for optical chassis according to the present invention.
Figure 2C:
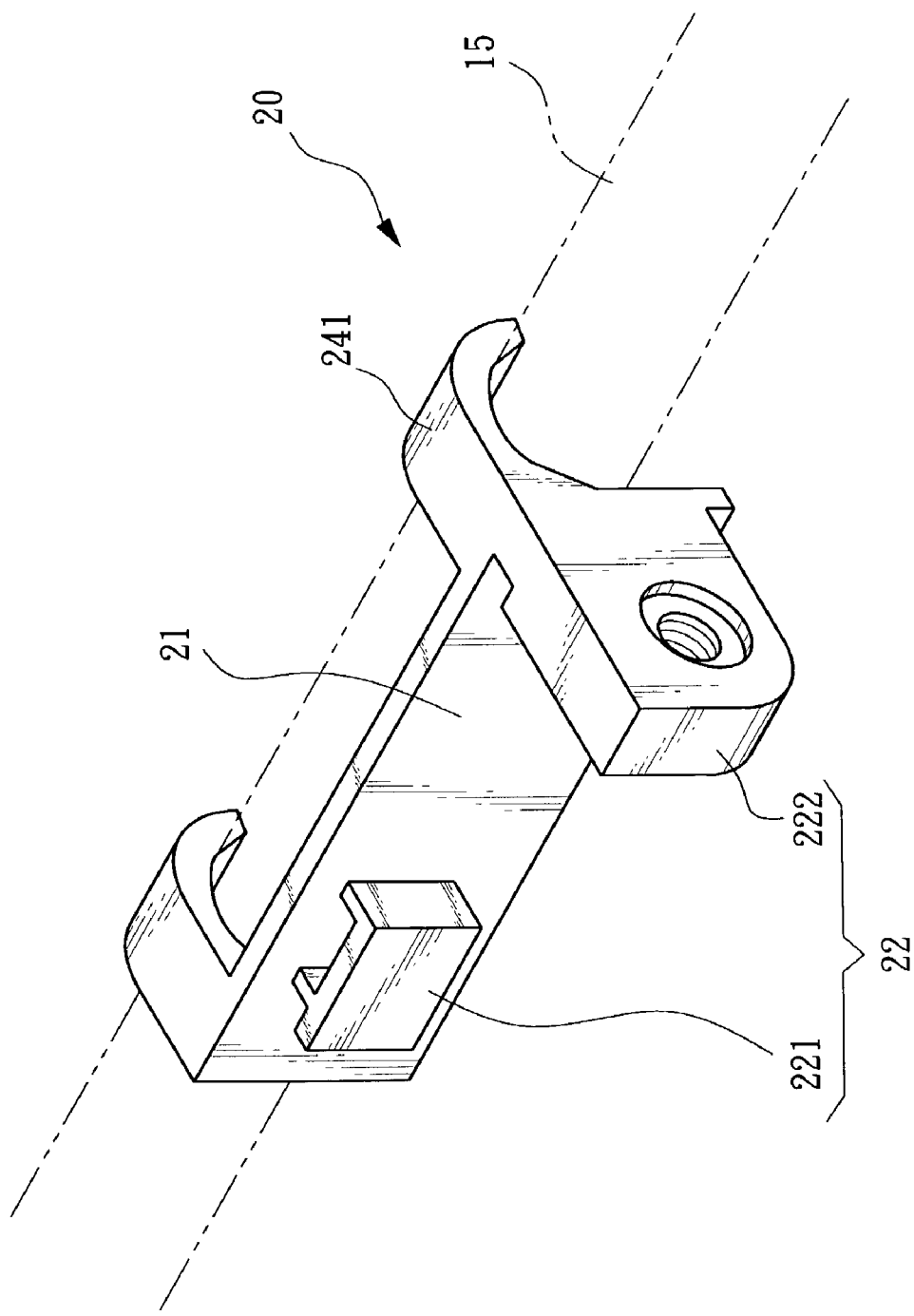
FIG. 2C is an implementation illustration of another viewing angle for the three-dimensional structure of the first preferable embodiment of the axle sleeve apparatus for optical chassis according to the present invention.

Please refer to FIG. 2A, which is a three-dimensional structural illustration for the preferable embodiment of the optical scanner according to the present invention. When the optical scanner 1 according, to the present invention executes a scanning job on a document 16 to be scanned, a document window glass 12 is arranged on the upper surface of the outer shell 11 of the optical scanner 1 for supporting the document 16 to be scanned. The optical scanner 1 is arranged with an optical chassis 14, which being guided along a guiding rod 15 in the hollow outer shell body 11 by a driving apparatus 13. The optical chassis 14 is made to make a linear displacement motion along the extension direction of the guiding rod 15 to precede the scanning job on the document 16 to be scanned on the document glass window 12. Wherein, one end surface of the optical chassis 14 is connected with an axle sleeve apparatus 20 for optical chassis. In the preferable embodiment of the present invention, the axle sleeve apparatus 20 for optical chassis is designed as only one single axle sleeve apparatus 20 for optical chassis that is connected to one end of the optical chassis 14. The axle sleeve apparatus 20 for optical chassis is also connected to the driving apparatus 13 to become an active end to bring along the optical chassis 14, while another end of the optical chassis 14 is connected to the guiding rod 15 to be moved as a passive end. Of course, it also can be that the axle sleeve apparatus 20 for optical chassis is designed correspondingly two ends of the optical chassis 14, so the number of the axle sleeve apparatus 20 for optical chassis will be two. Such kind of number transformation can be varied and executed by those who are skilled in this kind of arts according to above-mentioned disclosure, but it still keeps the merits of the invention and also within the spirit and scope of the invention, so repetitious description is not presented herein any more.

Please refer to FIG. 2B through FIG. 2G, which are the illustrations for the preferable embodiments of assembly and connection and the three-dimensional structure for preferable embodiments of the axle sleeve apparatus for optical chassis according to the present invention. Wherein, the axle sleeve apparatus 20 for optical chassis includes: an axle sleeve main body 21 and at least one anchoring mechanism 24. By the guidance of the guiding rod 15, the axle sleeve main body 21 making a linear displacement motion along the extension direction of the guiding rod 15. To consider fixing the anchoring mechanism 24 on the guiding rod 15 without shaking and saving material, in the preferable embodiments according to the present invention, two anchoring mechanisms 24 are designed in symmetry. Of course, the number could be one or more than three. Such kind of number transformation can be varied and executed by those who are skilled in this kind of arts according to above-mentioned disclosure, but it still keeps the merits of the invention and also within the spirit and scope of the invention, so repetitious description is not presented herein any more.

The anchoring mechanism 24 is arranged at one side of the axle sleeve main body 21 for preceding the connection with the guiding rod 15. In the preferable embodiments of the present invention, the anchoring mechanism 24 is arranged with: a convex arm 241 and an elastic body 242. The convex arm 241 and the axle sleeve main body 21 are polymers projected out and formed integrally as one body and are extended out one side of the axle sleeve main body 21. The polymers are preferably the plastic or its composites that are the oil-bearing or non-oil-bearing materials.

Figure 2E:
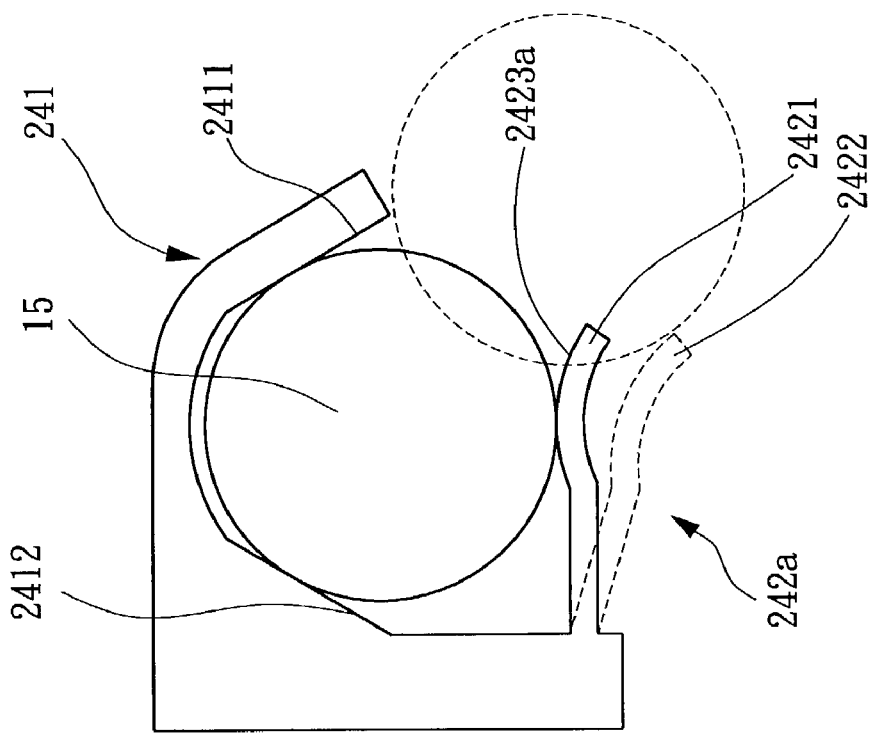
FIG. 2E is a motion implementation illustration of the cross-sectional structure of the second preferable embodiment of the axle sleeve apparatus for optical chassis matched with the guiding rod according to the present invention.
Figure 2D:
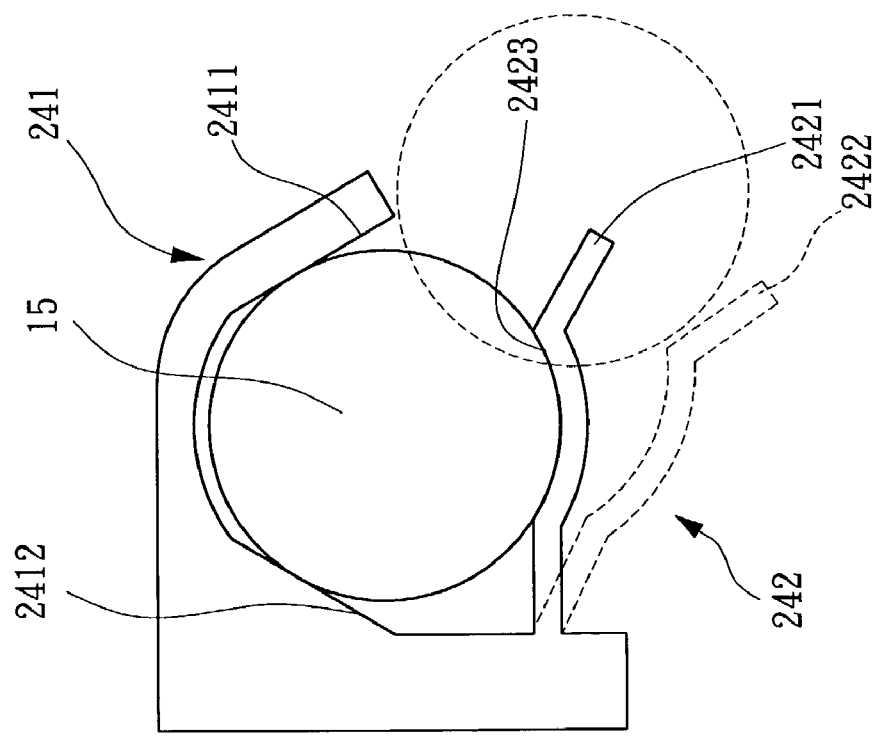
FIG. 2D is a motion implementation illustration of the cross-sectional structure of the first preferable embodiment of the axle sleeve apparatus for optical chassis matched with the guiding rod according to the present invention.
Figure 2F:
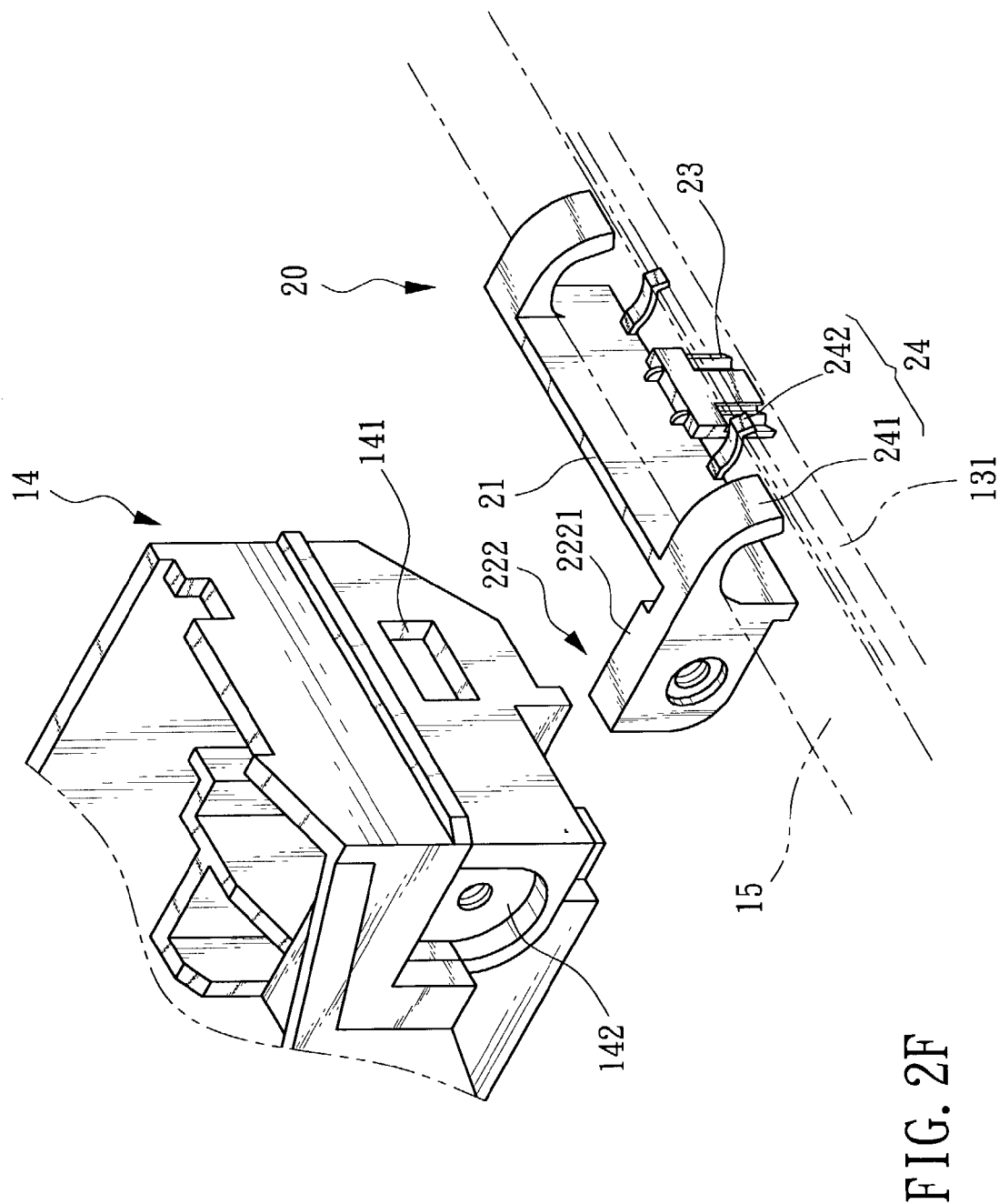
FIG. 2F is an explosive implementation illustration of the three-dimensional cross-sectional structure of the preferable embodiment of the axle sleeve apparatus for optical chassis matched with the guiding rod and the optical chassis according to the present invention.
Figure 2G:
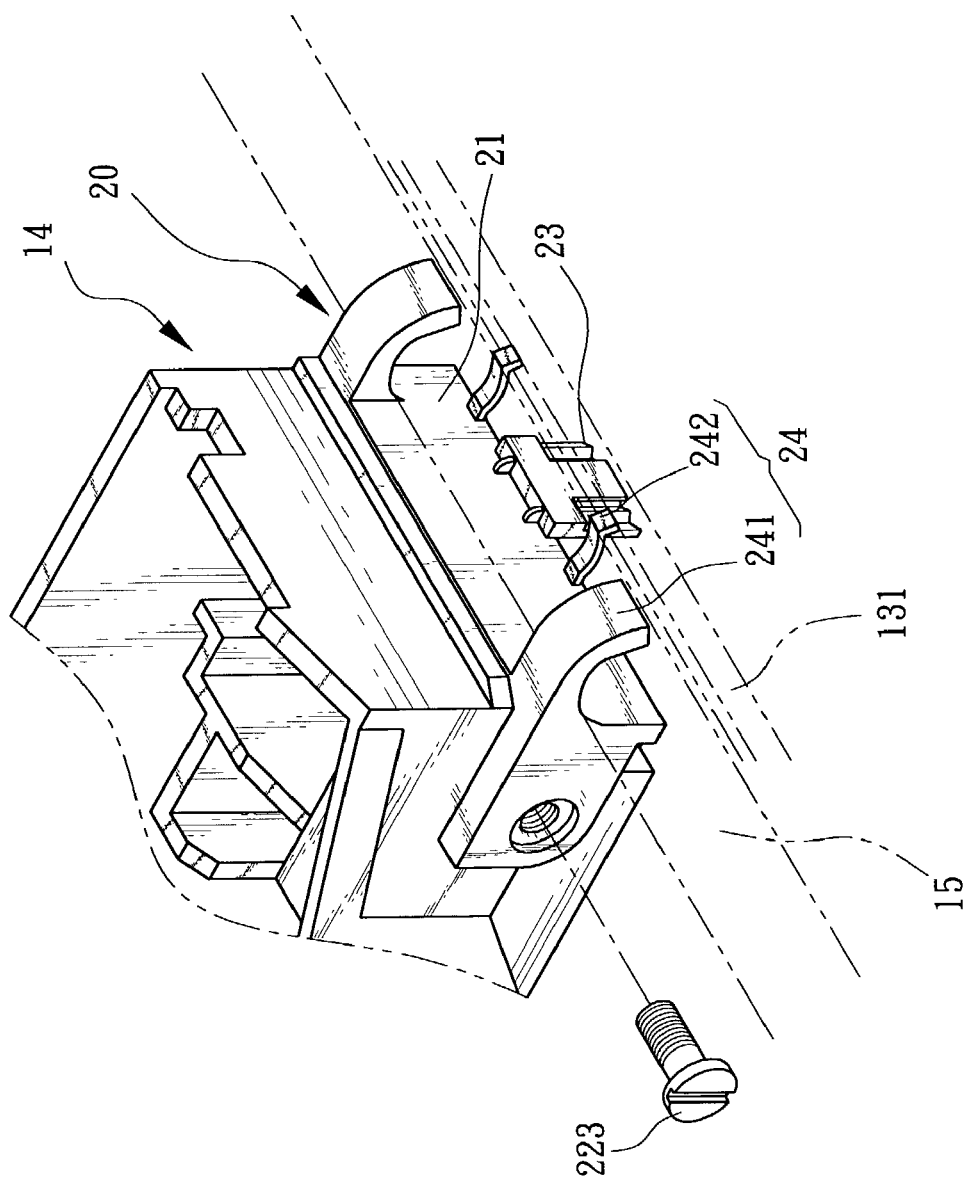
FIG. 2G is an assembling implementation illustration of the three-dimensional cross-sectional structure of the preferable embodiment of the axle sleeve apparatus for optical chassis matched with the guiding rod and the optical chassis according to the present invention.

Please refer to FIG. 2D and FIG. 2E, are the motion implementation illustrations of the cross-sectional structure of the preferable embodiments of the axle sleeve apparatus for optical chassis matched with the guiding rod according to the present invention. The convex arm 241 has a first incline 2411 and a second incline 2412 that is corresponding to the first incline 2411. By the provision of the first incline 2411 and the second incline 2412, the guiding rod 15 is placed and positioned. The elastic body 242 is corresponding to the convex arm 241. The elastic body 242 and the axle sleeve main body 21 are polymer that is projected out, formed and manufactured integrally as one body. In the preferable embodiments of the present invention, by elastic force, the elastic body 242 is moved between a first position 2421 and a second position 2422.

When the elastic body 242 chooses to be located at the first position, the axle sleeve apparatus 20 for optical chassis is connected to the guiding rod 15. In the preferable embodiment of the FIG. 2D, the elastic body 242 has a contacting surface 2423. The contacting surface 2423 and the guiding rod 15 are formed as a recessed cambered surface structure for surface contacting. Therefore, the contacting surface 2423, the first incline 2411, and the second incline 2412 are formed as a state capable of providing a placing for the guiding rod 15. In the preferable embodiment of the FIG. 2E, the elastic body 242a has a contacting surface 2423a. The contacting surface 2423a and the guiding rod 15 are formed as a convex cambered surface structure for point contacting. Therefore, the guiding rod 15 is located among the first incline 2411, the second incline 2412, and the elastic body 242 that are formed as a contact of three points to fix and position the guiding rod 15 and the axle sleeve apparatus 20 for optical chassis. The axle sleeve apparatus 20 for optical chassis making a linear displacement motion along the extension direction of the guiding rod 15. When the elastic body 242 chooses to enlarge the magnitude of the diameter of the guiding rod 15 by elastic force, the elastic body 242 is made to be located at the second position 2422; namely, the axle sleeve apparatus 20 for optical chassis being taken apart and separated from the guiding rod 15. In the preferable embodiment of the invention, the guiding rod 15 is a round rod. Of course, the guiding rod may also be a square rod or other forms that all may just make sure that the anchoring mechanism 24 being connected to the guiding rod 15 and make a linear displacement motion along the extension direction of the guiding rod 15. Such kind of transformation can be varied and executed by those who are skilled in this kind of arts according to above-mentioned disclosure, but it still keeps the merits of the invention and also within the spirit and scope of the invention, so repetitious description is not presented herein any more.

The axle sleeve main body 21 and the optical chassis 14 are fixed and connected integrally as one body, by applying the anchoring mechanism 24 to connect with the guiding rod 15. In the preferable embodiment of the present invention and in corresponding to the anchoring mechanism 24, another side of the axle sleeve main body 21 has a fastening mechanism 22. The fastening mechanism 22 is used for connecting with the optical chassis 14 to make the axle sleeve main body 21 be able to separate from the optical chassis 14. The fastening mechanism 22 is arranged with a convex fixing part 221 and a locking part 222. The convex fixing part 221 is arranged at another side of the axle sleeve main body 21 corresponding to the anchoring mechanism 24. The optical chassis 14 is further arranged with a recessed groove 141. The shape of the recessed groove 141 is matched with the convex fixing part 221 for providing an opening for receiving the convex fixing part 221. By being set into the recessed groove 141, the convex fixing part 221 is set-in-and-fixed with the optical chassis 14. One side of the locking part 222 is extended out the axle sleeve main body 21 and has a convex edge 2221. The optical chassis 14 is arranged with a corresponding recessed hole 142. After setting the convex edge 2221 into the recessed hole 142, the fastening mechanism 22 and the optical chassis 14 are fixed and connected, and a bolt 223 is then applied for locking and connecting to make the locking part 222 and the optical chassis 14 formed integrally as one body.

The conduction part 23 is arranged at an appropriate position of the lower side surface of the axle sleeve main body 21 and can be connected to a driving apparatus 13. Driven by the driving apparatus 13, the axle sleeve main body 21 can make a linear displacement motion along the guiding rod 15. In the preferable embodiment of the invention, the conduction part 23 is projected out the axle sleeve main body 21 and has a block structure shape of plural gears. The driving apparatus 13 is a power source (not shown in the drawing) that brings along a belt 131 with an appropriate gear ratio. The preferable design of the belt 131 is a belt with gear shape. The gear shape of the belt 131 is corresponding to the gear shape designed on the conduction part 23 for providing an accurate transmission for the belt 131 located at the conduction part 23. Therefore, when the axle sleeve apparatus 20 for optical chassis and the optical chassis 14 are connected together and located at the guiding rod 15, brought along by the driving apparatus 13, the optical chassis 14 and the axle sleeve apparatus 20 for optical chassis are made to move synchronously. The optical chassis 14 can make a linear displacement motion along the extension direction of the guiding rod 15 for executing the scanning job.

Figure 3:
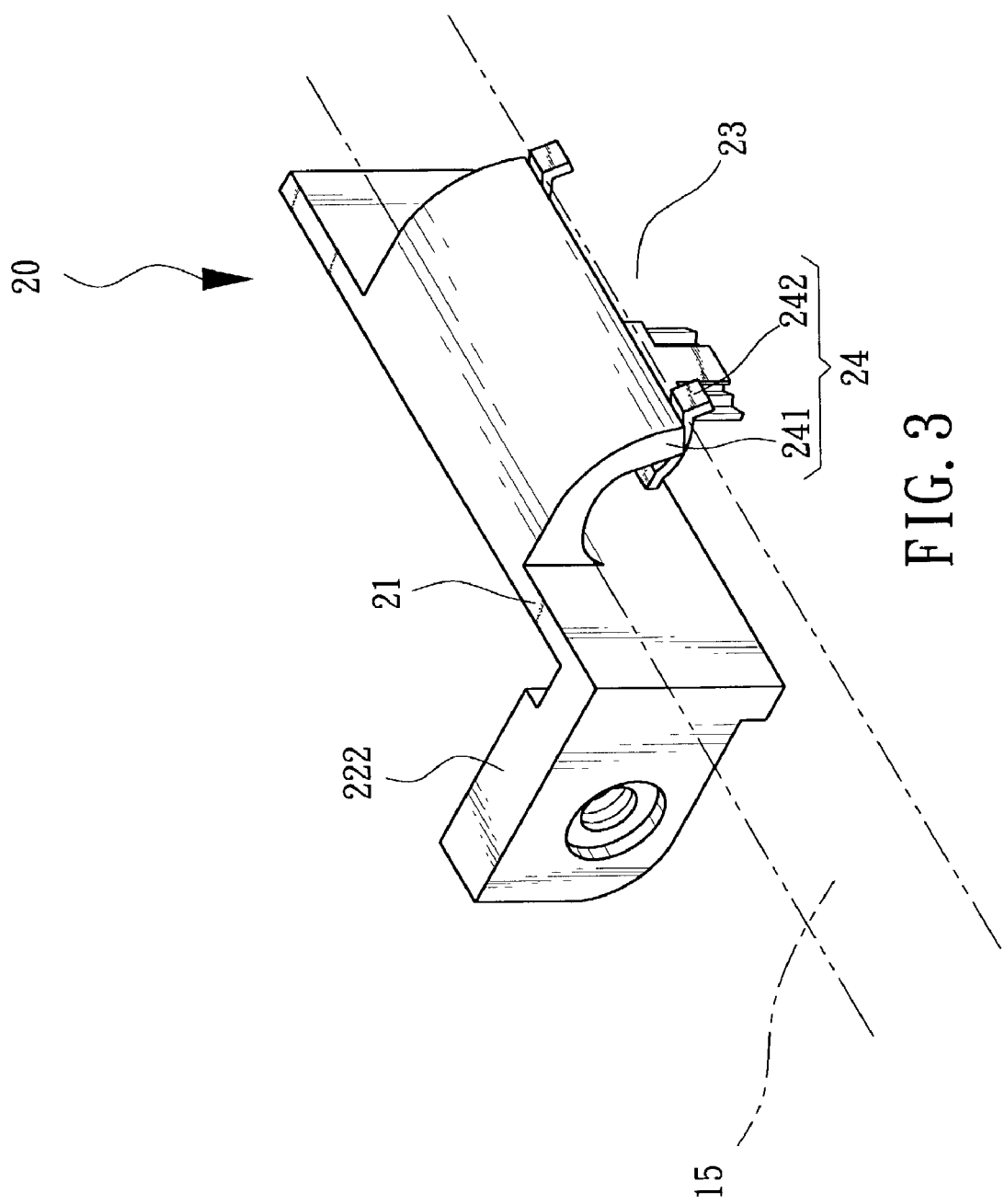
FIG. 3 is an illustration of the three-dimensional structure of the third preferable embodiment of the axle sleeve apparatus for optical chassis according to the present invention.

Please refer to FIG. 3, which is an illustration of a preferable implementation of the assembly and connection and the three-dimensional structure for another preferable embodiment of the axle sleeve apparatus for optical chassis and the scanner according to the present invention. In this preferable embodiment, most elements are the same as those of aforementioned embodiments, so a further detailed description is not presented herein. However, several differences are described in more detail herein. The anchoring mechanism 24 is arranged with a convex arm 241 and two elastic bodies 242 are also arranged correspondingly. Of course, the number of the elastic body 242 may also be three or more than three. For another variation of design, the anchoring mechanism 24 may also be arranged with one elastic body 242 and arranged with two or more than two convex arms 241 correspondingly. Variations of the above details may now be understood by a person who is skilled in this kind of arts according to the above-mentioned disclosure, but those variations are still within the spirit and scope of the invention, so further repetitious description is not presented herein.

Figure 4A:
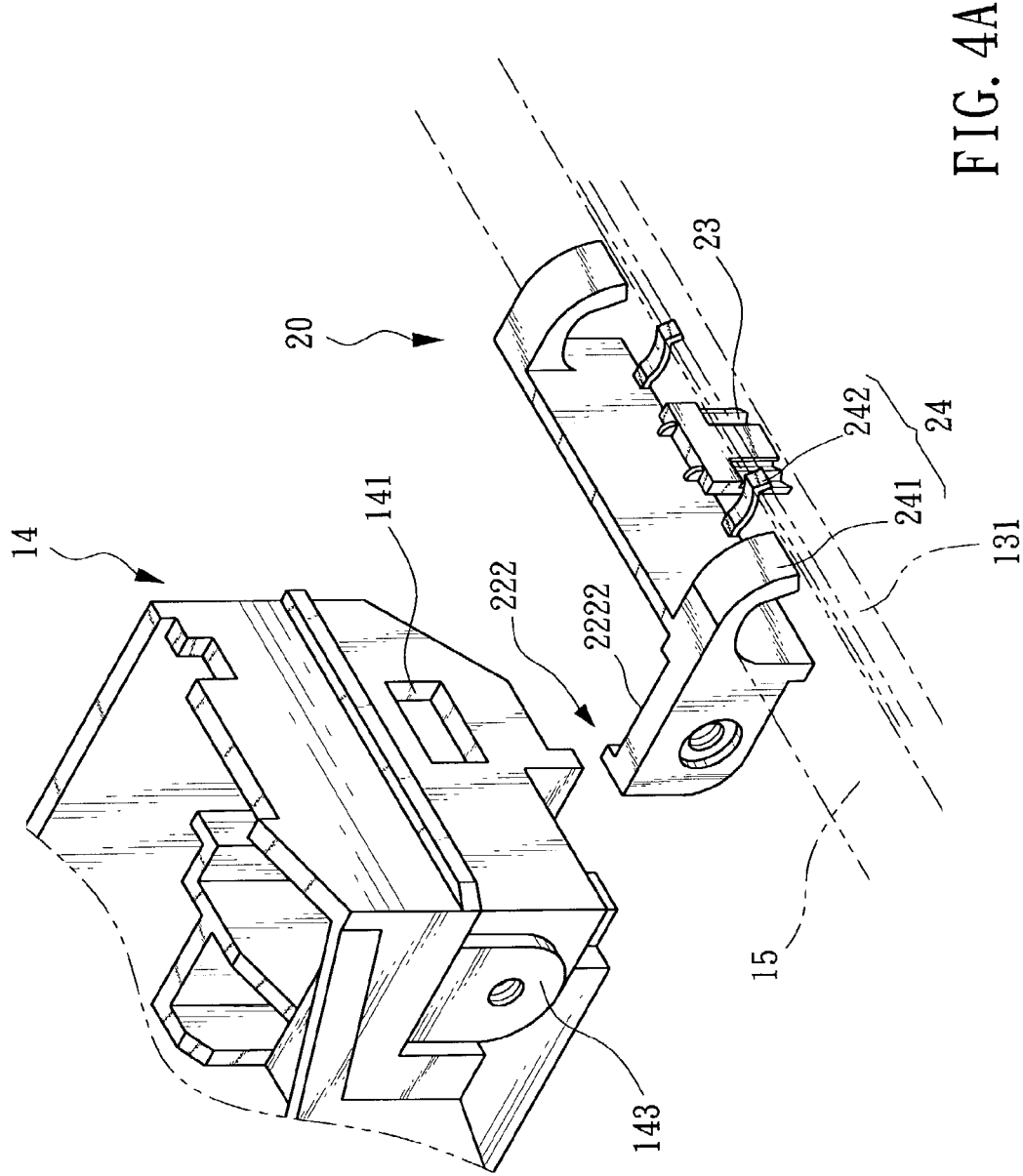
FIG. 4A is an explosive implementation illustration of the three-dimensional cross-sectional structure of the fourth preferable embodiment of the axle sleeve apparatus for optical chassis matched with the optical chassis according to the present invention.
Figure 4B:
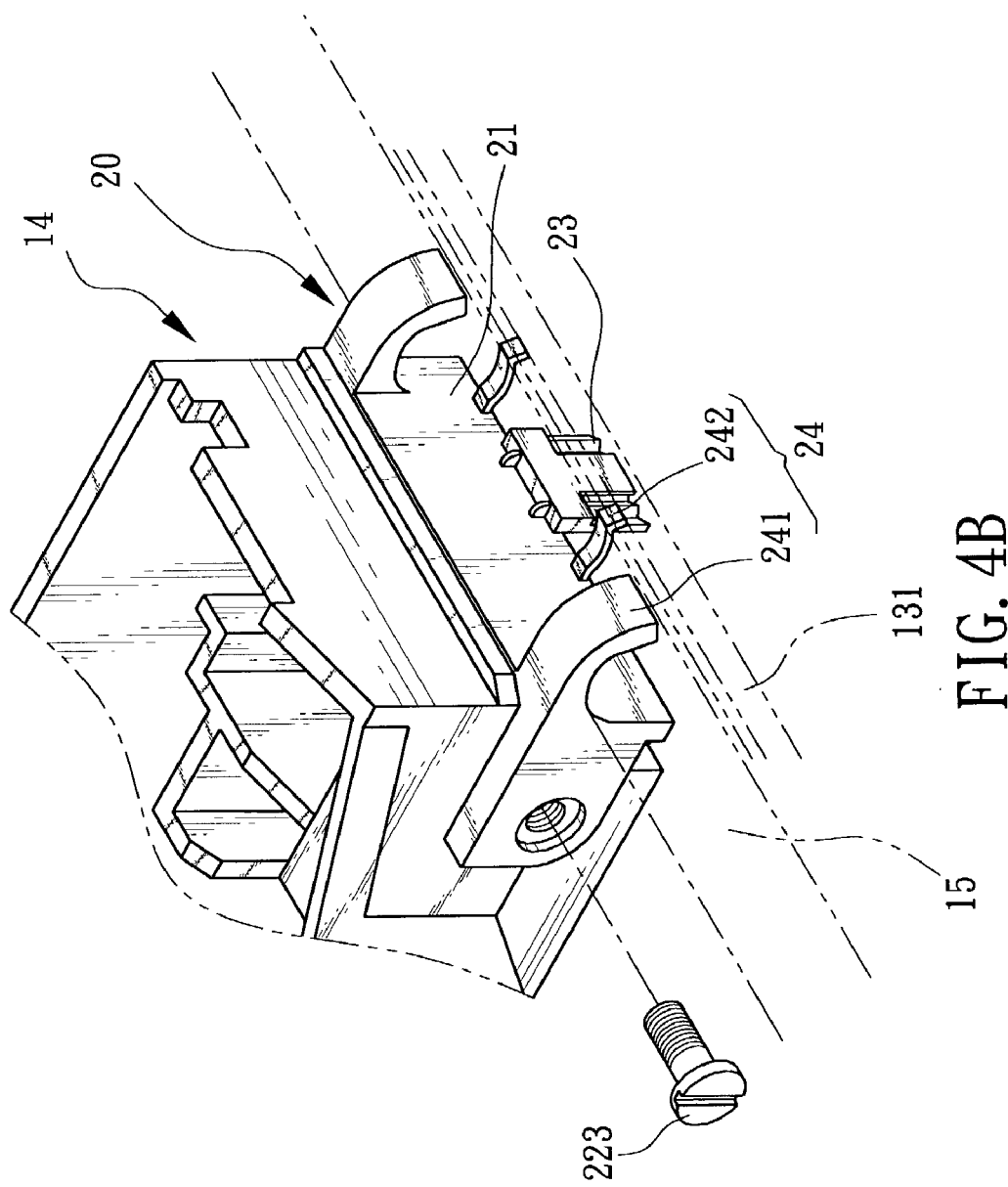
FIG. 4B is an assembling implementation illustration of the three-dimensional cross-sectional structure of the fourth preferable embodiment of the axle sleeve apparatus for optical chassis matched with the optical chassis according to the present invention.

Please refer to FIG. 4A and FIG. 4B, which are the preferable implementation illustrations for the assembly and connection and the three-dimensional structure for the further embodiment of the axle sleeve apparatus for optical chassis and the scanner according to the present invention. In this preferable embodiment, only the differences of the embodiment are described in more detail herein. The locking part 222 is extended out one side of the axle sleeve main body 21 and has a recessed hole 2222. The optical chassis 14 has a corresponding convex edge 143. After setting the convex edge 143 into the recessed hole 2222, the locking part 222 and the optical chassis 14 are then positioned and connected together. A bolt 223 is further applied for locking and connecting for making the locking part 222 and the optical chassis 14 formed integrally as one body. Such kind of transformation can be varied and executed by the person who is skilled in this kind of arts according to above-mentioned disclosure, but it still keeps the merits of the invention and also within the spirit and scope of the invention, so repetitious description is not presented herein any more.

Figure 5:
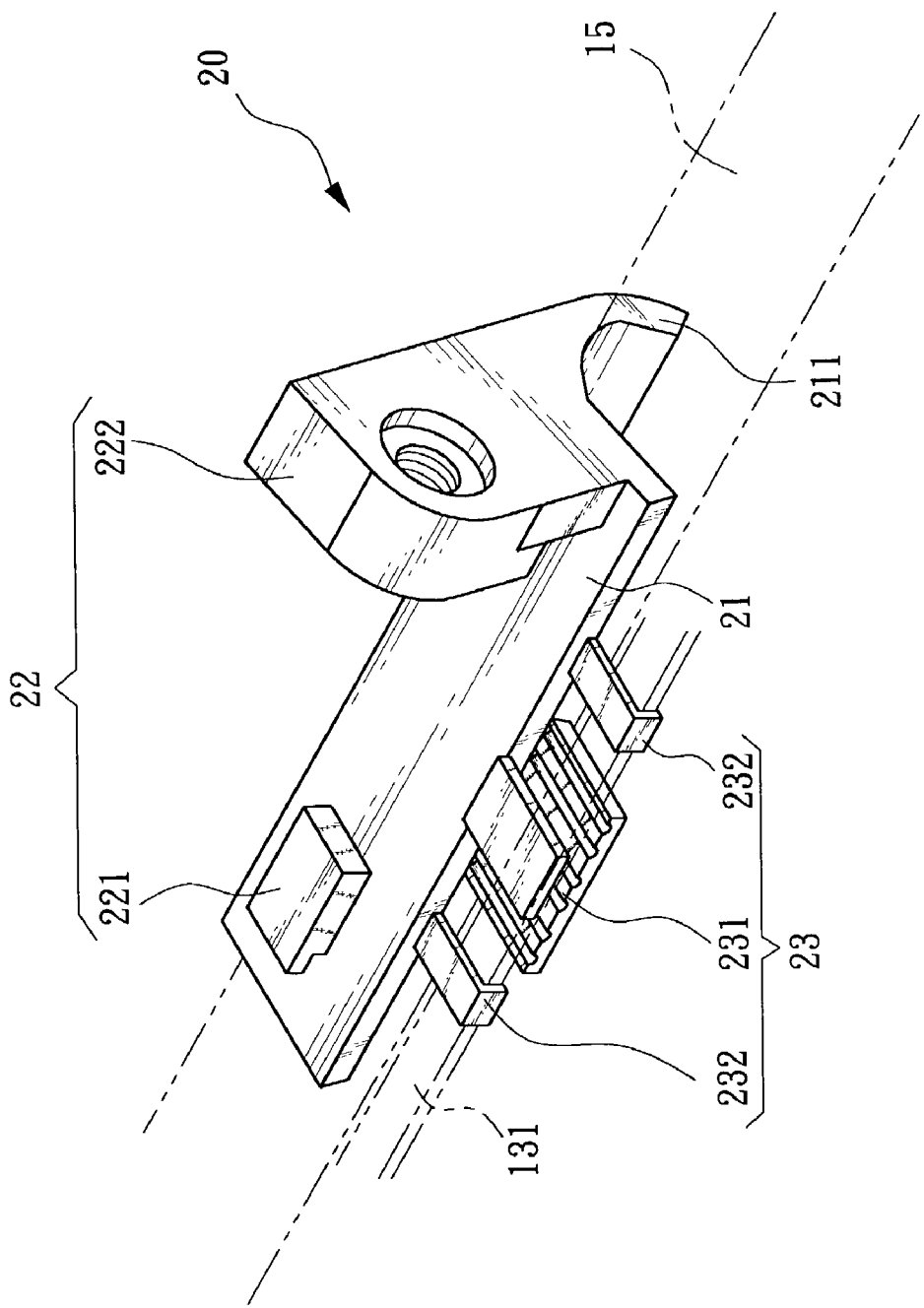
FIG. 5 is an illustration of the three-dimensional structure of the fifth preferable embodiment of the axle sleeve apparatus for optical chassis according to the present invention.

Please refer to FIG. 5, which is the preferable implementation illustration for the assembly and connection and the three-dimensional structure for another embodiment of the axle sleeve apparatus for optical chassis and the scanner according to the present invention. In this preferable embodiment, only the differences of the embodiment are described in more detail herein. Wherein, the conduction part 23 includes: a fastening part 231 and at least one reverse hook 232. The fastening part 231 is arranged at one side of the axle sleeve main body 21 and is projected out the axle sleeve main body 21. The reverse hook 232 is kept an appropriate distance from the fastening part 231. In the preferable embodiment of the present invention, the two reverse hooks 232 are located respectively at two sides of the fastening part 231. The design of the reverse hook 232 is an "L" shape. Of course, its number may also be one or more and it may also be located at other positions or belong to other forms. Such kind of variations of number, position and form are familiar to those who are skilled in the arts, so repetitious description is not presented herein any more. The driving apparatus 13 is a power source (not shown in the drawings) for bringing along a belt 131 with appropriate gear ratio. The preferable design for the belt 131 is a belt having gear shape. The gear shape of the belt 131 is corresponding to the gear shape designed at the fastening part 231 for providing accurate transmission for the belt 131 located at the fastening part 231. The reverse hook 232 is provided for placing the belt 131. Therefore, when the axle sleeve apparatus 20 for optical chassis and the optical chassis 14 are connected together, brought along by the driving apparatus 13, the optical chassis 14 and the axle sleeve apparatus 20 for optical chassis being made to move synchronously. Since the reverse hook 232 is provided for placing and fixing the driving apparatus 13 to prevent the driving apparatus 13 from dropping off due to shaking, so it may prevent the axle sleeve apparatus 20 for optical chassis from separating from the driving apparatus 13 during moving or bumping. The optical chassis 14 is making a linear displacement motion along the extension direction of the guiding rod 15 for executing the scanning job.

What is claimed is:

1. An axle sleeve apparatus for optical chassis, by the guidance of a guiding rod, the optical chassis making a linear displacement motion along the extension direction of the guiding rod, comprising:
    an axle sleeve main body, which has a fastening mechanism capable of proceeding connection with the optical chassis; and
    at least one anchoring mechanism, which is arranged at one side of the axle sleeve main body and capable of proceeding connection with the guiding rod, comprising:
    a convex arm, which is extending out one side of the axle sleeve main body; and
    an elastic body, which is corresponding to the convex arm, and by elastic force, the elastic body is configured to move between a first position and a second position;
    wherein, the elastic body may choose to be located at the first position to make the axle sleeve apparatus for optical chassis connected with the guiding rod and make a linear displacement motion along the extension direction of the guiding rod, or the elastic body may choose to be located at the second position to make the axle sleeve apparatus for optical chassis separate from the guiding rod.

2. The axle sleeve apparatus for optical chassis according to claim 1, wherein the axle sleeve apparatus for optical chassis has a conduction part, which is arranged on the axle sleeve main body and being connected with a driving apparatus, brought along by which the axle sleeve main body is made to make a linear displacement motion along the guiding rod.

3. The axle sleeve apparatus for optical chassis according to claim 2, wherein the conduction part comprises:
    a fastening part, which is arranged at one side of the axle sleeve main body and projected out the axle sleeve main body for providing a connection with the driving apparatus; and
    at least one reverse hook, which is kept an appropriate distance from the fastening part for providing a placing for the driving apparatus.

4. The axle sleeve apparatus for optical chassis according to claim 3, wherein the reverse hook is shaped as an "L" for providing a fixing and connection with the driving apparatus.

5. The axle sleeve apparatus for optical chassis according to claim 2, wherein the driving apparatus is a belt.

6. The axle sleeve apparatus for optical chassis according to claim 1, wherein the fastening mechanism is arranged with a convex fixing part, which is arranged at one side of the axle sleeve main body, and by setting the optical chassis into the convex fixing part, the axle sleeve main body being fixed and connected with the optical chassis.

7. The axle sleeve apparatus for optical chassis according to claim 6, wherein the optical chassis has a recessed groove, which provides for the setting-in for the convex fixing part.

8. The axle sleeve apparatus for optical chassis according to claim 1, wherein the fastening mechanism is arranged with a locking part, which is extended out one side of the axle sleeve main body, and by applying a bolt, the locking part is locked and connected with the optical chassis.

9. The axle sleeve apparatus for optical chassis according to claim 8, wherein the locking part has a convex edge, which is matched with the optical chassis to be arranged with an installment of a recessed hole, and by setting the convex edge into the recessed hole, the fastening mechanism is positioned and fixed with the optical chassis.

10. The axle sleeve apparatus for optical chassis according to claim 8, wherein the locking part has a recessed hole, which is matched with the optical chassis to be arranged with an installment of convex edge, and by setting the convex edge into the recessed hole, the fastening mechanism is positioned and fixed with the optical chassis.

11. The axle sleeve apparatus for optical chassis according to claim 1, wherein the convex arm has a first incline and a corresponding second incline, and by the provision of the first incline and the second incline, the guiding rod is placed and positioned.

12. The axle sleeve apparatus for optical chassis according to claim 1, wherein the convex arm and the axle sleeve main body are manufactured together.

13. The axle sleeve apparatus for optical chassis according to claim 1, wherein the elastic body and the axle sleeve main body are manufactured together.

14. The axle sleeve apparatus for optical chassis according to claim 1, wherein the elastic body has a contacting surface, which is a surface contact with the guiding rod for providing a placing-in for the guiding rod.

15. The axle sleeve apparatus for optical chassis according to claim 14, wherein the contacting surface is a recessed cambered surface.

16. The axle sleeve apparatus for optical chassis according to claim 1, wherein the elastic body has a contacting surface, which is a point contact with the guiding rod for providing a fixing for the guiding rod.

17. The axle sleeve apparatus for optical chassis according to claim 16, wherein the contacting surface is a convex cambered surface.

18. An axle sleeve apparatus for optical chassis, by the guidance of a guiding rod, the optical chassis making a linear displacement motion along the extension direction of the guiding rod, comprising:
    means for connecting with the optical chassis; and
    means for connecting with the guiding rod, said means for connecting with the guiding rod comprising:
    means for extending outwardly on one side of the axle main body; and
    means, coupled to said means for extending outwardly, for moving between a first position and a second position by an elastic force;
    wherein said means for moving between a first position and a second position is configured to be disposed in the first position to make the axle sleeve apparatus for optical chassis connect with the guiding rod to make a linear displacement motion along an extension direction of the guiding rod, or said means for moving between a first position and a second position is configured to be disposed in the second position to make the axle sleeve apparatus for optical chassis separate from the guiding rod.

19. The axle sleeve apparatus for optical chassis according to claim 18, wherein the axle sleeve apparatus for optical chassis comprises conduction means, which is arranged on said means for connecting with the optical chassis and being connected with driving means, brought along by which said means for connecting with the optical chassis is capable of making a linear displacement motion along the guiding rod.

20. The axle sleeve apparatus for optical chassis according to claim 19, said conduction means comprising:
fastening means, arranged at one side of said means for connecting with the optical chassis and projected out the axle sleeve main body, said fastening means for providing a connection with the driving apparatus; and
reverse hook means, disposed at an appropriate distance from said fastening means, for providing a placing for said driving means.

21. The axle sleeve apparatus for optical chassis according to claim 20, wherein said reverse hook means comprises means for providing a fixing and connection with said driving means.

22. The axle sleeve apparatus for optical chassis according to claim 19, wherein said driving means comprises a belt means.

23. The axle sleeve apparatus for optical chassis according to claim 18, wherein said fastening means is arranged with a convex fixing part, which is arranged at one side of said means for connecting with the optical chassis, and by setting the optical chassis into the convex fixing part, said means for connecting with the optical chassis is fixed and connected with the optical chassis.

24. The axle sleeve apparatus for optical chassis according to claim 23, wherein the optical chassis comprises means for the setting-in for the convex fixing part.

25. The axle sleeve apparatus for optical chassis according to claim 18, wherein said fastening means is arranged with locking means, capable of extending out one side of the axle sleeve main body, and by applying a bolt, the locking means is locked and connected with the optical chassis.

26. The axle sleeve apparatus for optical chassis according to claim 25, wherein said locking means has a convex edge, which is matched with the optical chassis to be arranged with an installment of recessed hole, and by setting the convex edge into the recessed hole, said fastening means is positioned and fixed with the optical chassis.

27. The axle sleeve apparatus for optical chassis according to claim 25, wherein said locking means has a recessed hole, which is matched with the optical chassis to be arranged with an installment of convex edge, and by setting the convex edge into the recessed hole, said fastening means is positioned and fixed with the optical chassis.

28. The axle sleeve apparatus for optical chassis according to claim 18, wherein said means for extending outwardly has a first incline and a corresponding second incline, and by the provision of the first incline and the second incline, the guiding rod is placed and positioned.

29. The axle sleeve apparatus for optical chassis according to claim 18, wherein the convex arm and the axle sleeve main body are manufactured together.

30. The axle sleeve apparatus for optical chassis according to claim 18, wherein the elastic body and the axle sleeve main body are manufactured together.

31. The axle sleeve apparatus for optical chassis according to claim 18, wherein said means for moving between a first position and a second position by an elastic force has a contacting surface, which is a surface contact with the guiding rod for providing a placing-in for the guiding rod.

32. The axle sleeve apparatus for optical chassis according to claim 31, wherein the contacting surface is a recessed cambered surface.

33. The axle sleeve apparatus for optical chassis according to claim 18, wherein said means for moving between a first position and a second position by an elastic force has a contacting surface, which is a point contact with the guiding rod for providing a fixing for the guiding rod.

34. The axle sleeve apparatus for optical chassis according to claim 33, wherein the contacting surface is a convex cambered surface.

35. A scanner comprising:
an optical chassis;
an axle sleeve main body operable to connect to said optical chassis;
at least one anchoring mechanism connected to said axle sleeve main body, said at least one anchoring mechanism operable to engage a guiding rod; and
wherein said at least one anchoring mechanism includes an elastic body that is operable to move between a first position contacting said guiding rod and a second position separated from said guiding rod.

36. The scanner of claim 35, further comprising: a conduction part connected to said axle sleeve main body, wherein said conduction part is operable to move said axle sleeve main body along said guiding rod.

37. The scanner of claim 36, wherein said conduction part comprises: a fastening part operable to connect said axle sleeve main body to a driving apparatus.

38. The scanner of claim 37, wherein said conduction part further comprises: at least one hook positioned a first distance from said fastening part at least in part to position said driving apparatus.

39. The scanner of claim 38, wherein said at least one hook is shaped as an "L".

40. The scanner of claim 37, wherein said driving apparatus comprises a belt.

41. The scanner of claim 35, wherein said axle sleeve main body further comprises a fastening mechanism operable to connect said axle sleeve main body to said optical chassis.

42. The scanner of claim 41, wherein said fastening mechanism comprises a convex fixing part positioned at one side of said axle sleeve main body, wherein said convex fixing part is operable to connect said axles sleeve main body to said optical chassis.

43. The scanner of claim 42, wherein the optical chassis includes a recessed groove operable to engage said convex fixing part.

44. The scanner of claim 41, wherein said fastening mechanism further includes a locking part positioned on one side of said axle sleeve main body, wherein said locking part is operable to fix said axle sleeve main body to said optical chassis.

45. The scanner of claim 44, wherein said locking part comprises a convex edge operable to engage a recessed hole positioned on said optical chassis.

* * * * *

UNITED STATES PATENT AND TRADEMARK OFFICE
CERTIFICATE OF CORRECTION

PATENT NO.        : 7,433,087 B2
APPLICATION NO. : 10/142386
DATED             : October 7, 2008
INVENTOR(S)       : Yin-Chun Huang Page 1 of 1

It is certified that error appears in the above-identified patent and that said Letters Patent is hereby corrected as shown below:

At column 7, line 32, delete "may choose" and insert -- is configured --, therefor.

At column 7, line 32, delete "at the" and insert -- at either the --, therefor.

At column 7, lines 36-37, delete "or the elastic body may choose to be located at the" and insert -- or at the --, therefor.

Signed and Sealed this

First Day of September, 2009

David J. Kappos
*Director of the United States Patent and Trademark Office*